(12) United States Patent
Kaganovich

(10) Patent No.: US 8,532,367 B2
(45) Date of Patent: Sep. 10, 2013

(54) SYSTEM AND METHOD FOR 3D WIREFRAME RECONSTRUCTION FROM VIDEO

(75) Inventor: Vitaliy M. Kaganovich, Los Angeles, CA (US)

(73) Assignee: Raytheon Company, Waltham, MA (US)

(*) Notice: Subject to any disclaimer, the term of this patent is extended or adjusted under 35 U.S.C. 154(b) by 240 days.

(21) Appl. No.: 12/858,218

(22) Filed: Aug. 17, 2010

(65) Prior Publication Data

US 2012/0045091 A1    Feb. 23, 2012

(51) Int. Cl.
*G06K 9/00*      (2006.01)
(52) U.S. Cl.
USPC ........... 382/154; 382/103; 382/276; 345/419; 345/169
(58) Field of Classification Search
USPC ................. 382/154, 276, 103; 345/419, 169
See application file for complete search history.

(56) References Cited

U.S. PATENT DOCUMENTS

| | | | |
|---|---|---|---|
| 6,115,052 A * | 9/2000 | Freeman et al. | 345/473 |
| 7,257,237 B1 * | 8/2007 | Luck et al. | 382/103 |
| 2011/0187703 A1 * | 8/2011 | Patwardhan et al. | 345/419 |

FOREIGN PATENT DOCUMENTS

EP         2420975 A1    2/2012

OTHER PUBLICATIONS

Kakadiaris et al: "Model-Based Estimation of 3D Human Motion", IEEE Transactions on Pattern Analysis and Machine Intelligence, vol. 22, No. 12, Dec. 2000.*
Nguyen et al: "Fast Occluded Object Tracking by a Robust Appearance Filter", IEEE-PAMI, 2004.*
Rosten et al: "Fusing Points and Lines for High Performance Tracking", Proc. of IEEE-ICCV, 2005.*
Chen et al: "Reconstruction of Building Models with Curvilinear Boundaries from Laser Scanner and Aerial Imagery", Springer-Verlag Berlin Heidelberg, pp. 24-33, 2006.*
"European Application Serial No. 11169312.3, Response filed Jul. 27, 2012 to Extended European Search Report mailed Dec. 21, 2011", 18 pgs.
Cadman, Lee, et al., "Simultaneous feature tracking and three-dimensional object reconstruction from an image sequence", 2001 International Conference on Image Processing, 2001. Proceedings., (2001), 391-394.
Eade, E, et al., "Edge Landmarks in Monocular SLAM", Image and Vision Computing, 27(5), (2009), 588-596.
Kaganovich, Vitalitiy M, "European Serial No. 11169312.3, Extended Search report Mailed Dec. 21, 2011", 7.

(Continued)

*Primary Examiner* — Samir A. Ahmed
*Assistant Examiner* — Ruiping Li
(74) *Attorney, Agent, or Firm* — Schwegman Lundberg & Woessner, P.A.

(57) ABSTRACT

In one or more aspects of the present disclosure, a method, a computer program product and a system for reconstructing scene features of an object in 3D space using structure-from-motion feature-tracking includes acquiring a first camera frame at a first camera position; extracting image features from the first camera frame; initializing a first set of 3D points from the extracted image features; acquiring a second camera frame at a second camera position; predicting a second set of 3D points by converting their positions and variances to the second camera position; projecting the predicted 3D positions to an image plane of the second camera to obtain 2D predictions of the image features; measuring an innovation of the predicted 2D image features; and updating estimates of 3D points based on the measured innovation to reconstruct scene features of the object image in 3D space.

37 Claims, 6 Drawing Sheets

(56) References Cited

OTHER PUBLICATIONS

Lee, Seok-Han, et al., "Real-time camera tracking using a particle filter and multiple feature trackers", International IEEE Consumer Electronics Society's Games Innovations Conference, 2009. ICE-GIC 2009., (2009), 29-36.

Munguia, Rodrigo, et al., "Closing Loops With a Virtual Sensor Based on Monocular SLAM", IEEE Transactions on Instrumentation and Measurement, 58(8), (2009), 2377-2384.

Venter, Chris, et al., "Structure from Motion estimation using a Non-Linear Kalman Filter", University of Stellenbosch, (2002).

Yoon, Youngrock, et al., "A New Kalman-Filter-Based Framework for Fast and Accurate Visual Tracking of Rigid Objects", IEEE Transactions on Robotics, 24(5), (2008), 1238-1251.

Shim, M., et al., "A robust real-time structure from motion for situational awareness and RSTA", Proc. SPIE, vol. 6962, pp. 696205-696205-11 (2008) Abstract.

Schacht, J. R., et al., "Implementation of an embedded image-based tracker in a distributed architecture", Proc. SPIE, vol. 4714, 0. 165-174, Acquisition, Tracking and Pointing XVI, Michael K. Masten; Larry A. Stockum, Eds. (2002) Abstract.

Sawhney, H. S., et al., "Multi-view 3D estimation and applications to match move", IEEE Proc. MVIEW '99, pp. 21-28 (1999) Abstract.

Canny, J., "A computational approach to edge detection", IEEEE Trans. PAMI 8, pp. 679-714 (1986).

Julier, S. J., et al., "New extension of the Kalman filter to nonlinear systems", Proc. SPIE, vol. 3068, p. 182-193, Signal Processing, Sensor Fusion and, and Target Recognition VI, Ivan Kadar, Ed. (1997) Abstract.

Gelb, A., Editor, Applied optimal estimation, MIT Press, Cambridge, MA, 1974. (TOC).

Klein, G., et al., "Full-3D Edge Tracking with a Particle Filter", http://www.robots.ox.ac.uk/ActiveVision/Publications/klein_murray_bmvc2006/klein_murray_bmvc2006.pdf.

Mordohai, J., et al., "Real-Time Video-Based Reconstruction of Urban Environments", http://www.cs.unc.edu/Research/urbanscape/public/UNC-UKY_UrbanReconstuction07.pdf, Proceedings of Mar. 3, 2007.

\* cited by examiner

SYSTEM AND METHOD FOR 3D WIREFRAME RECONSTRUCTION FROM VIDEO

BACKGROUND

This disclosure relates generally to the field of three-dimensional (3D) image reconstruction and, more specifically, to a method, a computer program product and a system for 3D wireframe image reconstruction from video.

3D image reconstruction has a variety of potential civilian and military uses, such as 3D urban modeling for virtual globes and simulations, unmanned vehicle navigation and obstacle avoidance, and intelligent scene tracking and aimpoint maintenance. Many tracking scenarios can be handled by a single-target tracker or a two-dimensional (2D) scene tracker, but more complicated scenarios require a tracker that understands the scene's 3D geometry. Assuming that the scene is mostly rigid, the goal is not to track a particular object, but to track the camera itself. This principle is the basis of matchmoving technology used in cinematography and augmented reality applications to insert virtual objects into real camera footage.

Standard 2D video feature trackers and scene trackers often lose track due to motion parallax effects, such as perspective rotation, deformation, and occlusion. Optical flow-based feature trackers suffer from the aperture problem and have trouble tracking features that rotate or deform. Template matchers must segment foreground objects from background objects that appear to move at a different rate. Occlusions result in lost tracks. Correlation-based scene trackers mistake perspective rotation for drift, even when the camera is already aimed perfectly.

A basic 2D scene tracker uses a correlator to measure image shifts from frame to frame, and a Kalman filter to smooth out the jitter and compensate for the drift. The Kalman filter is an efficient recursive filter that estimates the state of a dynamic system from a series of noisy measurements. As a rule, the 2D scene tracker should not detect any drift when the camera is already aimed perfectly at a single spot. However, a simple 2D correlator can mistake perspective rotation for drift because it fails to recognize the scene's 3D geometry.

Different camera tracking applications have specific advantages and challenges that affect implementation. The tracker system described in the present disclosure is geared toward applications such as airborne navigation, targeting, and rapid 3D urban reconstruction, which requires real-time automated operation from a stand-off distance. This requirement precludes human intervention or batch-processing many frames at a time. One advantage of a targeting or a surveillance system is that the camera is usually calibrated in advance so that its intrinsic parameters are known, and even the extrinsic parameter estimates may be available from an inertial navigation system (INS), so the tracker needs only to correct the pointing angles. At significant stand-off distance, small camera rotation can be approximated as image shift, and videos usually lack sharp persistent features like corners preferred by many trackers.

What is needed is a tracker that can reconstruct the static scene's 3D geometry, given a good estimate of the camera motion.

SUMMARY

As described in the various aspects of the present disclosure, a tracker system and method can be configured to employ the use of contours as opposed to feature points such as corners, discussed above. The tracker can be configured to run automatically in real-time, which sets it apart from matchmoving software, which generally allows user interaction— for instance to select salient feature points—and can afford to run off-line and utilize noncausal optimization algorithms like bundle adjustment. The tracker as described in the various aspects below can be configured to use a causal Kalman filter, and therefore can run in real-time on a computer system.

In accordance with various embodiments of this disclosure, a method for reconstructing scene features of an object in 3D space using structure-from-motion feature-tracking includes acquiring a first camera frame at a first camera position; extracting image features from the first camera frame; initializing a first set of 3D points from the extracted image features; acquiring a second camera frame at a second camera position; predicting a second set of 3D points by converting their positions and variances to the second camera position; projecting the predicted 3D positions to an image plane of the second camera to obtain 2D predictions of the image features; measuring an innovation of the predicted 2D image features; and updating estimates of 3D points based on the measured innovation to reconstruct scene features of the object in 3D space.

In accordance with various embodiments of this disclosure, a computer program product includes a computer usable medium having a computer readable program code embodied therein. The computer readable program code is adapted to be executed by a processor to implement functions that include acquiring a first camera frame at a first camera position; extracting image features from the first camera frame; initializing a first set of 3D points from the extracted image features; acquiring a second camera frame at a second camera position; predicting a second set of 3D points by converting their positions and variances to the second camera position; projecting the predicted 3D positions to an image plane of the second camera to obtain 2D predictions of the image features; measuring an innovation of the predicted 2D image features; and updating estimates of 3D points based on the measured innovation to reconstruct scene features of an object in 3D space.

In accordance with various embodiments of this disclosure, a system for reconstructing scene features of an object image in 3D space using structure-from-motion feature-tracking, the system comprising a camera configured to acquire a first camera frame of the object image at a first camera position and a second camera frame of the object at a second camera position; a controller configured to extract image features from the first camera frame, initialize a first set of 3D points from the extracted image features; predict a second set of 3D points by converting their positions and variances to the second camera position, project the predicted 3D positions to an image plane of the second camera to obtain 2D predictions of the image features, measure an innovation of the predicted 2D image features and update estimates of 3D points based on the measured innovation; and an output configured to output the reconstructed scene features of the object image in 3D space.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the specification and in the claims, the singular form of "a", "an", and "the" include plural referents unless the context clearly dictates otherwise.

DETAILED DESCRIPTION

Figure 1:
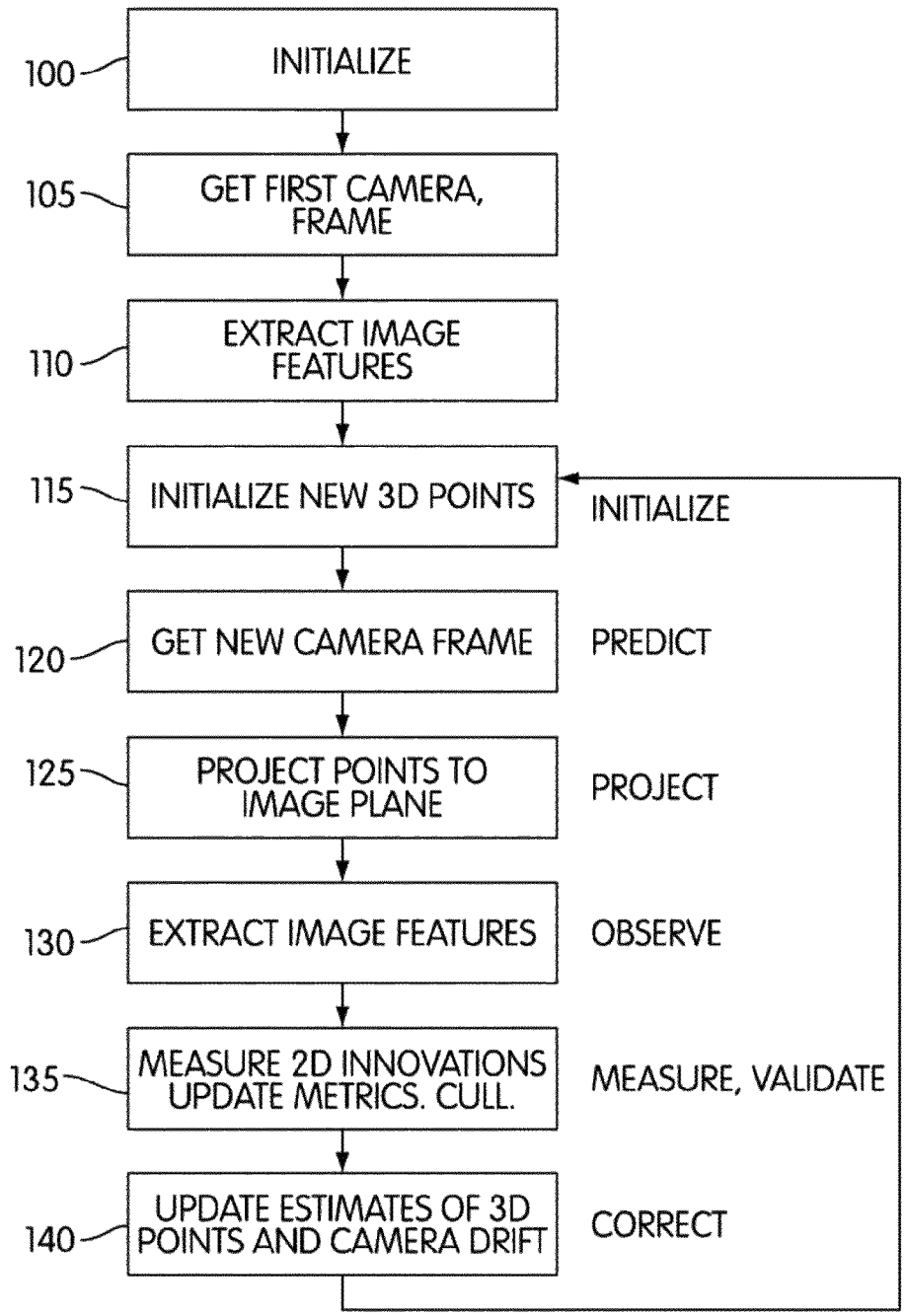
FIG. 1 shows a functional flow chart for a 3D tracker employing a Kalman filter in accordance with various aspects of the present disclosure.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

FIG. 1 shows a functional flow chart for a 3D tracker employing a Kalman filter in accordance with various aspects of the present disclosure. The process is initialized at 105 where a first camera frame is obtained. Image features of a first camera frame are then extracted at 110. By way of a non-limiting example, the image features may be contours of the image.

The tracker's functional flow can be described by a dynamic system model underlying the Kalman filter. Table 1 below describes various components of the dynamic system model.

TABLE 1

| Dynamic system model | |
|---|---|
| $x_{k+1} = A_k x_k + w, w \sim N(0, Q_k)$ | $x_k$ = true 3D positions in k-th camera's coordinate system |
| $z_k = h(x_k) + v, v \sim (0, R_k)$ | |
| $x_k \| z_0 \ldots k-1 \sim N(x_k, P_k)$ | $\hat{x}_k$ = predicted estimate of $x_k$ |
| $x_k \| z_0 \ldots k \sim N(x'_k, P'_k)$ | $x'_k$ = updated estimate of $x_k$ |
| $(x'_k, P'_k) = K(x_k, P_k, z_k)$ | $P_k$ = predicted covariance of $x_k$ |
| $x_{k+1} = A_k x'_k$ | $P'_k$ = updated covariance of $x_k$ |
| $P_{k+1} = A_k P'_k A_k^T = Q_k$ | $A_k$ = transformation from k-th to (k + 1)-th coordinate system |
| | h(x) = projection of x to the image plane |
| | z = location of extracted features corresponding to h(x) |
| | w = process noise from camera drift or object motion |
| | v = measurement noise from blurring and mismatches |
| | $K(x_k, P_k, z_k)$ = Kalman update, given the k-th video frame |

In some aspects of the disclosure, the 3D points are tracked independently, each one having its own variance ellipsoid. In some aspects, collective behavior such as drift, can be estimated by merging all the tracked points and other variables into a single state vector, which can grow to store hundreds of points. Its single variance can be initialized as a block diagonal matrix, where each block is a variance matrix of a tracked variable. To track camera drift not captured by the inertial navigation system (INS), a drift vector and its variance ellipse can be appended to the state vector and its variance respectively. As discussed above, 2D image shifts can approximate small camera rotations that deviate from the camera motion represented by matrix $A_k$ in Table 1.

Figure 2:
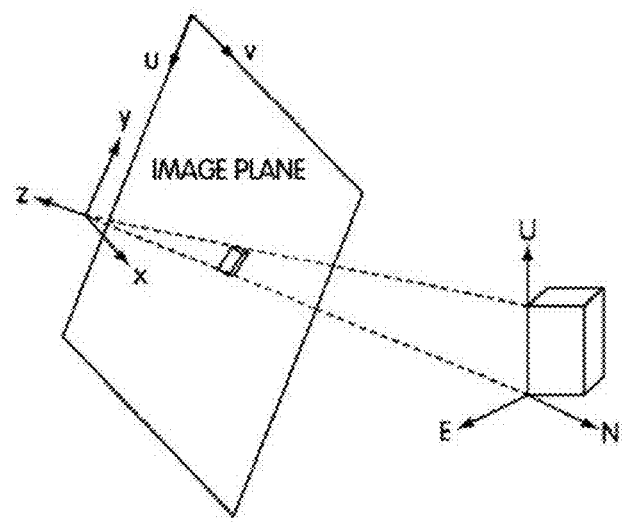
FIG. 2 shows camera and scene coordinates that may be used in accordance with various aspects of the present disclosure.

FIG. 2 shows camera and scene coordinates that may be used in accordance with various aspects of the present disclosure. Global East-North-Up (ENU) coordinate system can have an arbitrary origin, as long as it's consistent over time. State vectors are expressed in homogeneous coordinates. Conversion from the Global coordinate system to a camera (xyz) coordinate system, or from one camera to another, is an affine transformation, namely a rotation and a translation, constructed from the camera's relative position and orientation, which are provided by the INS. If the image has been de-rotated, the camera roll angle is zero. Conversion from camera coordinates to image plane (uv) coordinates is a perspective projection. The camera's intrinsic parameters are the focal length, image offset, and pixel size and aspect ratio, and are assumed to be known.

Contours were chosen as the image feature to track mainly to overcome difficulties tracking roads and blurry objects that have no distinct spots like corners or peaks for a small tracking window to lock onto. For example, by placing a small window on a road using distinct spots or points creates an aperture problem, which results when the small window is placed on a line and will tend to slide along that line. The aperture problem tends to be worst when a rotational axis is perpendicular to a plane formed by the 3D line and the line-of-sight (LOS) to the line. Tracking the local window with a 2D correlator becomes even more difficult when fast perspective rotation causes the road to rotate within the window or jump outside the window. Pattern matching fails to find correspondences between two frames when all windows along the road look alike. Contours provide more context, and lead to a 3D wireframe-like reconstruction of objects.

The contours can be extracted by a Canny edge detector, which is known, and uses a multi-stage algorithm to detect a wide range of edges in an image. The edge detection algorithm used in the Canny edge detector is constructed to mark as many real edges in the image as possible, where the edges marked should be as close as possible to the edges in the real image. Also, the algorithm is constructed such that a given edge in the image should only be marked once, and where possible, image noise should not create false edges. The Canny edge detector has three parameters: two thresholds for sensitivity and continuity, and a Gaussian blur radius that specifies edge softness and amount of noise suppression. The extracted contours are a collection of independent edgels: edge pixels and their tangent vectors. The contours can be interpolated to assign a precise subpixel position to each edgel. The uncertainty in each edgel's position is represented by a variance ellipse aligned with the edgel's tangent vector. Its diameter perpendicular to the tangent reflects errors from blurring, rasterization, and small jitter. Its second, usually major, diameter along the tangent reflects the chance of confusing nearby edgels. Setting this diameter inversely proportional to the contour curvature will make it small at a tight turn and large on a straight line. The larger it is, the less weight will be given to perceived motion along the tangent.

Turning again to FIG. 1, assuming that all objects in the scene are below the camera, new 3D points and their variance ellipsoids are initialized at 115 by back-projecting the edgels and variances ellipses from the camera's image plane to random altitudes near the ground. Varying the altitudes increases the likelihood that every object has at least some points nearby to lock onto it, so that no objects are missed. For scene geometries where a horizontal ground is a poor initial approximation, other surfaces or 3D locations can be used, such as planes orthogonal to the line-of-sight. The size of an initialized 3D point's variance ellipsoid is proportional to its range from the camera. The variance ellipsoids are very elongated in range because the range to the point was not observed by the camera and had to be guessed. Intuitively, the tracker has more freedom to adjust the point's position along the variance ellipsoid axis with the longer diameter. The edgels are stored together with their respective initialized 3D points and variances.

A tendency of dense contours is that nearby edgels most likely correspond to nearby 3D points. Thus, if some nearby edgels are known to correspond to high quality points, then new points are initialized to the mean position of those points rather than a back-projection from the image plane. Likewise, the new point's variance ellipsoid is the mean of the existing variances, although it still gets enlarged and elongated in range. This technique quickly fills in gaps between points during range closure, creating a dense 3D reconstruction. In some aspects, random edgels are selected to initialize points, and the total number of points has a ceiling. In some aspects, more points may be allocated to objects entering the field of view or emerging from behind an occlusion.

If the single state vector and covariance matrix, as discussed above, are used to represent the entire set of points, then contour continuity constraints can be set by initializing large covariances between neighboring points on a contour, in their respective positions in the covariance matrix.

Turning again to FIG. 1, the new frame's camera pose is obtained from the INS at 120, and the new 3D points are predicted by converting their positions and variances to the new camera's coordinate system. The 3D point coordinates are tracked in the camera coordinate system and are converted to the global coordinate system only before being output. The prediction step is the transformation of the state and variance from one camera to the next, represented by matrix $A_k$ in Table 1. If $C_k$ is the transformation from the global coordinate to the k-th camera coordinates, then $A_k = C_{k+1} C_k^{-1}$. These matrices were implemented as an affine transformation for state transformations, and a linear transformation for variance transformations, because the latter is a rotation without translation. In the affine case, $A_k^{-1}$ represents the position and orientation of the (k+1)-th camera in the k-th camera coordinate system. In the linear case, $A_k^{-1} = A_k^T$.

Although the scene is static, adding process noise variance to the state variance makes the tracker more adaptable by giving the state estimates room for improvement. Otherwise, if the state variance shrinks too much, the tracker starts ignoring new information from video frames. Furthermore, when the state variance is near zero, it becomes numerically unstable.

Turning again to FIG. 1, before the predicted 3D points can be matched to new 2D contours, their positions and variances must first be projected at 125 onto the camera's image plane with a projection matrix containing the camera's intrinsic parameters, $$h = \begin{pmatrix} 0 & f_y & N/2 & 0 \\ -f_x & 0 & M/2 & 0 \\ 0 & 0 & 1 & 0 \end{pmatrix},$$

where M and N are the number of horizontal and vertical pixels, and $f_x$ and $f_y$ are the horizontal and vertical pixels per radian, respectively.

By way of a non-limiting example, on a 640×480 display, with 10000 pixels per radian, a 3D prediction with homogeneous coordinates (0, 50, −10000, 1) in the camera coordinate system illustrated in FIG. 2, projects to (−190000, −3200000, −10000). Dividing by the z-component yields the image plane uv, or (row, column), homogeneous coordinates (190, 320, 1). This is the 2D prediction represented by h(x).

The variance ellipsoid is also projected onto the image plane to mark a neighborhood around the 2D prediction where the true 3D point's projection is expected to be found. If the 3D contour tangents were tracked, they would be projected as well, but for simplicity the 2D tangents are saved from the previous frame's edgels.

Turning again to FIG. 1, according to the dynamic system model, the new frame's 2D predictions are the 3D predictions projected onto the new image plane at 130, while the new frame's extracted 2D contours are the true 3D contours projected onto the new image plane and shifted by measurement noise. Correspondences between the 2D predictions and the new edgels are determined by two heuristics: proximity to each other and similarity of the tangents. In some aspects, these may be approximated in order to increase processing speed.

Barring excessive measurement noise, an extracted edgel is expected to be located within the projected variance ellipsoid of a corresponding 2D prediction. These ellipsoids tend to be very elongated in one direction, as discussed above, so only their major axis, represented by two 3D endpoints, was projected onto the image plane, creating a 2D line segment. The corresponding edgel is expected to lie on this predicted segment, greatly reducing the search space. The segment may be clipped against the image borders using the known Cohen-Sutherland line clipping algorithm with outcodes. The Cohen-Sutherland line clipping algorithm divides a 2D space into 9 parts, of which only the middle part (viewport) is visible. The clipped line segment may be rasterized with an efficient midpoint algorithm and dilated, or thickened, by a few pixels. Only these pixels were searched for extracted edgels.

Figure 3:
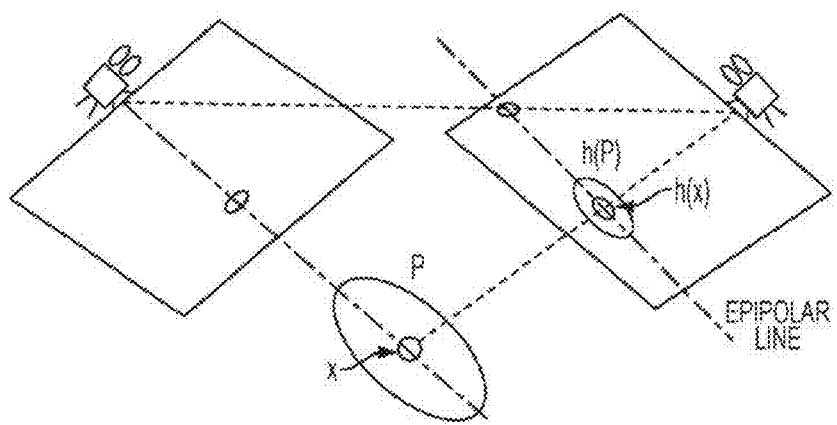
FIG. 3 shows 3D prediction, x, and its variance ellipsoid, P, projected to the image plane, where the projected variance ellipsoid, h(P), is initially parallel to the epipolar line in accordance with various aspects of the present disclosure.

FIG. 3 shows 3D prediction, x, and its variance ellipsoid, P, projected to the image plane where the projected variance ellipsoid, h(P), is initially parallel to the epipolar line in accordance with various aspects of the present disclosure. This use of the variance ellipsoid generalizes the epipolar line to multiple frames. The Figure illustrates that both the variance ellipse and the epipolar line reduce the search space. However, the epipolar line geometrically relates only two successive frames, while the variance ellipse incorporates information from all past frames.

Multiple edgels are likely to be found within the search space wherever the extracted contours intersect the predicted line segment described above. Two metrics measure their proximity to a given prediction: perpendicular distance from the predicted line segment, and distance from the 2D prediction at the segment's midpoint. The first metric selects edgels close to the intersection, and the second metric selects the contour closest to the midpoint whenever multiple contours intersect one predicted line segment. In addition to being close to the 2D prediction, the corresponding extracted edgel is expected to have a similarly oriented tangent. The third metric measures tangent similarity as the difference between the tangent angles of the extracted edgel and the previous frame's edgel stored with the predicted point.

An extracted edgel's total metric is the weighted sum of the three metrics defined above. The weights may be selected ad hoc. The extracted edgel with the smallest metric is selected as the observation corresponding to the given 2D prediction, and it replaces the edgel that was previously stored with the prediction. A single extracted edgel is allowed to correspond to multiple 2D predictions. The total metric is stored with the point as a quality measure.

The measurement noise variance ellipse, R, is calculated and aligned with the corresponding edgel's tangent due to greater ambiguity and potential for mismatches in that direction. In some aspects, the ellipse diameters are constants, with the major axis rotated parallel to the tangent. The vector from the 2D prediction to its corresponding observation is the innovation, represented as z−h(x), which is stored together with the 3D point and related information. In general, the innovation is the difference between the observed value of a variable at time t and the optimal forecast of that value based on information available prior to time t. In particular for the formation of the present disclosure, the innovation can be expressed as z−h(x).

Turning again to FIG. 1, the innovations are validated at 135 to determine outliers. The validation measures the ratio of the innovation's magnitude to the size of the measurement noise variance as follows: $(z-(x))^T R^{-1}(z-h(x))$. If this ratio exceeds a threshold, the innovation falls outside the validation gate and is considered an outlier, which may suggest a lost track or an occlusion. Track quality is evaluated against two main criteria. The first is the total metric discussed above, which is used to recursively update a stored quality metric via an alpha filter: $q_k=(1-a)q_{k-1}+(a)$ metric$_k$. Points whose q-value exceeds a threshold are culled.

The second criterion for track quality is a record of events that either support or oppose a tracked point. For example, every valid innovation increases support, while every failure to find a corresponding edgel increases opposition. Points without a valid innovation cannot be updated, so they skip the update step, which equates to going into coast. Coasting is similar to dead reckoning, as discussed above. Table 2 below outlines the logic behind coasting and culling tracks. It's the most heuristic part of the tracker.

TABLE 2

Decision tree for evaluating tracks

Coast (skip the update step)
- outside field of view
- no matches found → gain opposition
  - no edgels found in search space
  - all edgel metrics exceed threshold
- innovation outside validation gate → gain opposition Culled
- opposition greatly exceeds support
- quality metric exceeds threshold Turning again to FIG. 1, in some aspects of the disclosure, all the information can be updated at 140 and may be used to estimate camera drift. At this stage, all the necessary information is ready for a Kalman update step: the innovation (z−h(x)), the noise variance R, the 3D prediction x, and the 3D variance P. Two types of Kalman filters were tested, as discussed below, producing similar results.

In some aspects of the present disclosure, an Extended Kalman filter (EKF) may be used to update the information. In general Kalman filters are known and are an efficient recursive filter that estimates the state of a linear dynamic system from a series of noisy measurements. Together with a linear-quadratic regulator (LQR), the Kalman filter solves a linear-quadratic-Gaussian control problem (LQG). Since the Kalman filter is a recursive estimator, this means that only the estimated state from the previous time step and the current measurement are needed to compute the estimate for the current state and no history of observations and/or estimates is required. The basic Kalman filter is limited to a linear assumption of the process model and/or the observation model. In the Extended Kalman filter (EKF), the state transition and observation models need not be linear functions of the state, but may instead be differentiable functions, such as:

$$x_k = f(x_{k-1}, u_k) + w_k$$

$$z_k = h(x_k) + v_k$$

where the function $f$ can be used to compute the predicted state from the previous estimate and similarly the function h can be used to compute the predicted measurement from the predicted state. However, f and h cannot be applied to the covariance directly. Instead a matrix of partial derivatives (the Jacobian) is computed. At each timestep the Jacobian is evaluated with current predicted states. These matrices can be used in the Kalman filter equations. This process essentially linearizes the non-linear function around the current estimate.

Because the projection function, h(x), is nonlinear, its Jacobian must be computed.

$$h(\vec{x}) = \begin{pmatrix} u \\ v \end{pmatrix} = \begin{pmatrix} f_y y/z + N/2 - \\ f_x x/z + M/2 \end{pmatrix},$$

where the 3D prediction, $\vec{x}=(x,y,z)$, is not in homogenous coordinates.

$$H = \frac{dh}{d\vec{x}} = \frac{1}{z}\begin{pmatrix} 0 & f_y & N/2-u \\ -f_x & 0 & M/2-v \end{pmatrix},$$

where the 2D prediction has coordinates (u, v). The update step follows $$Y = P^{-1}, Y' = Y + H^T R^{-1} H$$

$$K = (Y')^{-1} H^T R^{-1},$$

$$x' = x + K(z-h(x)) = x + K(\text{innovation}).$$

Instead of estimating the variance, P, this variant of the filter estimates the inverse variance, or information matrix Y. This is the matrix that is actually stored with the tracked point because it could be initialized to near zero to indicate large uncertainty. Also, when the process noise is zero, the algorithm can be optimized to have an order of or $O(n^2)$ computational complexity instead of $O(n^3)$, which is significant when all points are merged into a single state.

In some aspects of the present disclosure, an Unscented Kalman filter (UKF) can perform better than the EKF on some nonlinear systems. When the state transition and observation models—that is, the predict and update function f and h (see above)—are highly non-linear, the EKF can give poor performance. This is because the mean and covariance are propagated through linearization of the underlying non-linear model. The UKF uses a deterministic sampling technique known as the unscented transform to pick a minimal set of sample point (called sigma points) around the mean. These sigma points are then propagated through the nonlinear functions, from which the mean and covariance of the estimate are then recovered. The result is a filter which more accurately captures the true mean and covariance. This can be verified using Monte Carlo sampling or through a Taylor series expansion of the posterior statistics. In addition, this technique removes the requirement to explicitly calculate Jacobians, which for complex functions can be a difficult task in itself. Instead of linearizing the projection function about the predicted value, it selects sample particles around the prediction, and computes statistics from the 3D particles and their 2D projections. The algorithm was implemented in the tracker's update step but not in the prediction step, because the prediction is affine, and only the update involves a nonlinear projection. The UKF updated the variance, unlike the EKF, which updated the inverse variance. The resulting tracks had slightly longer lifespans than those generated by the EKF, but otherwise were very similar.

In some aspects of the present disclosure, the update step can be repeated multiple times when the parallax is expected to be large between consecutive frames. After each update, the innovation must be recomputed, as the following pseudo-code demonstrates:

```
FOR i := 1 to N
    Y := Y + H^T R^-1 H
    K := Y^-1 H^T R^-1
    x := x + K (z − h(x))
END
```

This makes the 3D estimates converge faster. The use of multiple iterations to speed up convergence is more stable and precise than simply reducing the variance R or increasing P.

Finally, turning to FIG. 1, the process concludes at 140, where the process returns to initialize new 3D points at 115.

The tracker was tested using the UKF on both synthesized and real imagery, but the discussion below is limited to synthesized scenes. The simulator takes a camera trajectory and a simple 3D "box" model of buildings and roads, and generates interlaced video frames at 30 frames per second and instantaneous platform metadata in the same format as the real data. The virtual camera is set up with the same intrinsic parameters as the real camera, Gaussian blur is applied to the video frames, and noise can also be added. The camera can be made to drift by forcing rotations that are not reported in the metadata. However, the simulations discussed below have perfect metadata and perfectly aligned noise-free imagery.

As the tracker processes the simulated scene, it outputs the 3D point estimates and variance ellipsoid axes that can be compared with the true 3D model. It also outputs their 2D projections that can be overlaid onto the 2D video frames and compared with the results of other trackers. Lastly, it records statistics such as the average lifespan of the 3D point estimates.

The simulation discussed below tested the tracker's ability to track tall structures through rapid range closure, occlusions, and brief slips outside the field of view. The targets are two 10×10×30 meter blocks 50 meters apart. The ENU coordinate system is centered at the base of one of the blocks. The camera travels in a straight line from (−24, −16, 2) kilometers at a constant velocity (4, 4, 0) km/s. The aimpoint is maintained at the origin. The closest the camera comes to the origin is 6 km at coordinates (4, −4, 2) km, maintaining a speed of 5657 m/s, which is over Mach 16.

Figure 4A:
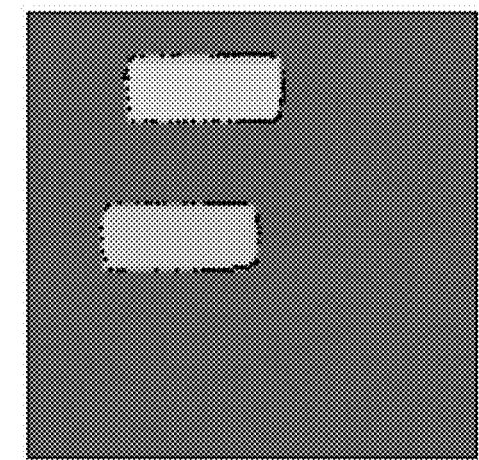
FIGS. 4$a$, 4$b$ and 4$c$ show the result of running the tracker on the scene with tall buildings where 3D point estimates are in the left column, and the 2D video frames are on the right in accordance with various aspects of the present disclosure.
Figure 4A:
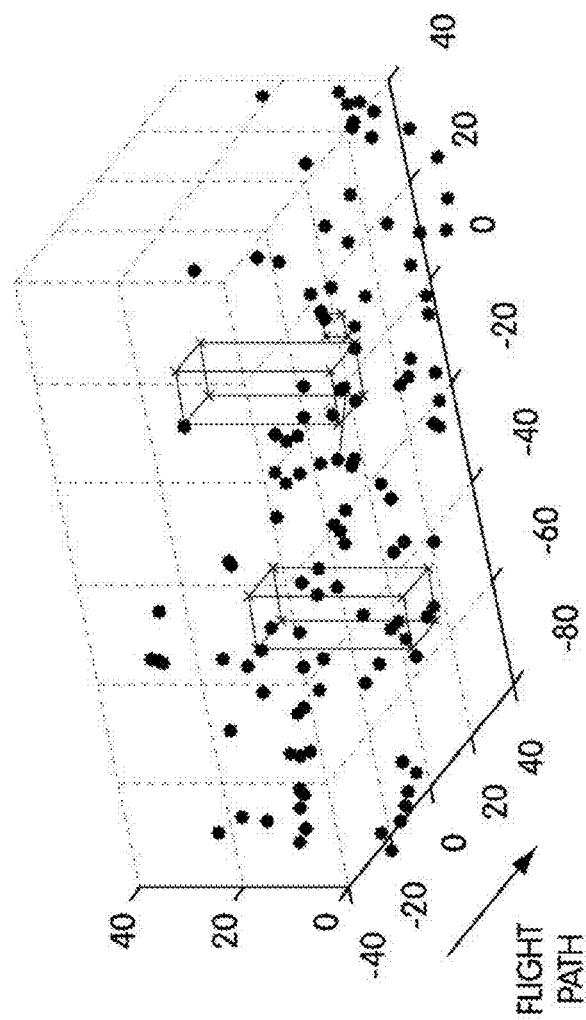
Figure 4B:
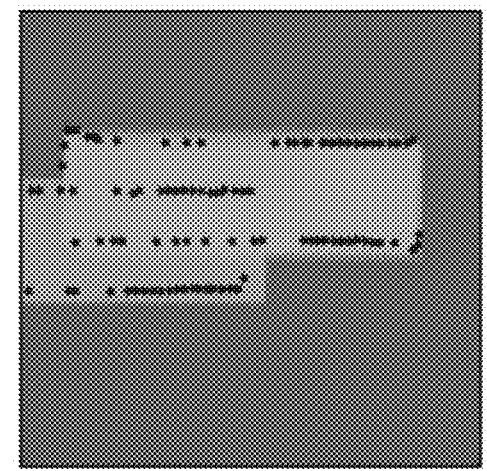
Figure 4B:
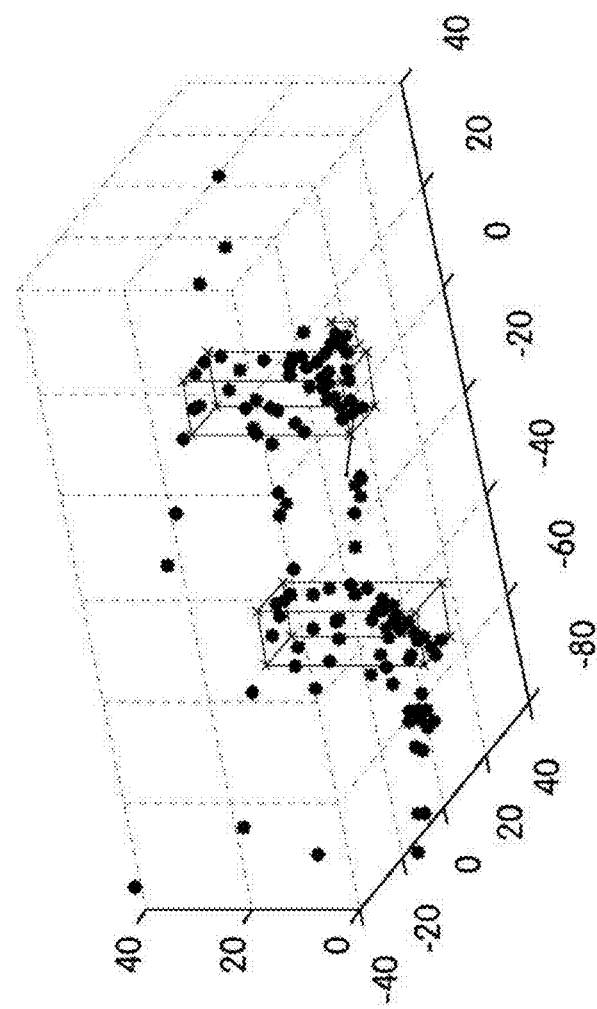
Figure 4C:
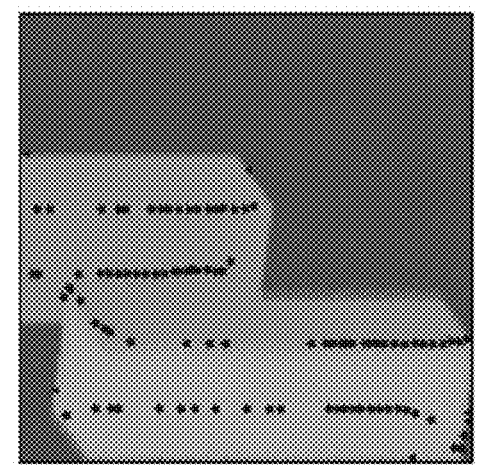
Figure 4C:
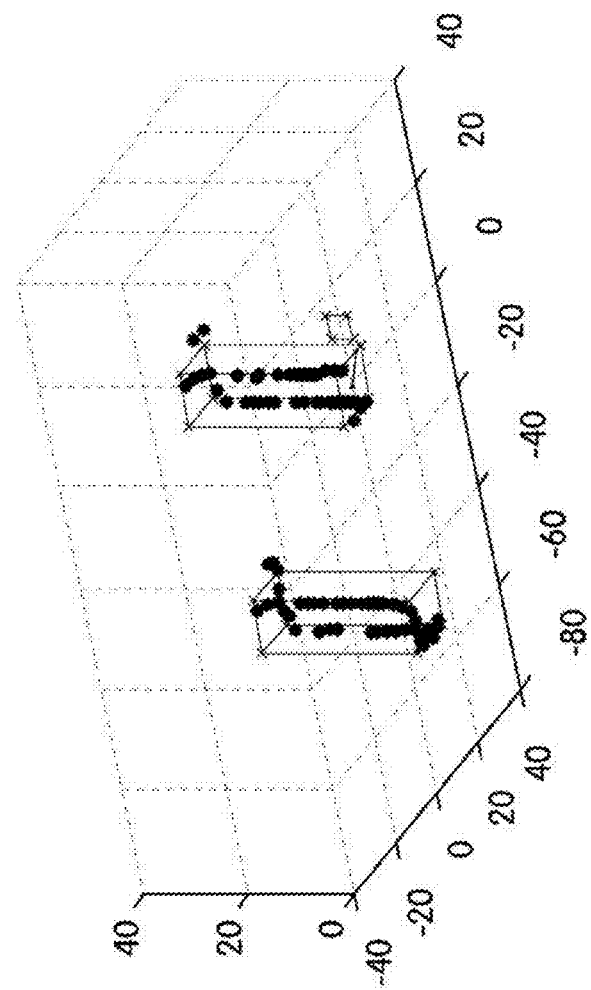

FIGS. 4a, 4b and 4c show the result of running the tracker on the scene with tall buildings where 3D point estimates in the left column, 2D video frames on the right in accordance with various aspects of the present disclosure. The left column of the Figure shows the 3D point estimates overlaid on the true model in three frames. The camera flyby is from the top left to the bottom left, all the while aimed at the origin. The 3D point estimates are initially scattered near the true targets. As the camera moves, the points lock onto the building's contours, eventually forming a dense wireframe.

The right column of the Figure shows the point estimates projected onto video frames as one building occludes the other. Although the points in the top frame (FIG. 4a) appear to trace the buildings well, they are in fact scattered in range. By the middle frame (FIG. 4b), they are at correct 3D positions. This allows the points locked onto the occluded building to coast and reacquire the building when it emerges, without losing track. The bottom frame (FIG. 4c) shows the points coasting through self-occlusion on the rear edge of the building, as the top of the building leaves the field of view. As the camera starts to retreat, the top of the building reemerges together with the points that had been locked onto it. Vertical contours were easier to track than horizontal contours in this simulation because they are less affected by interlacing and because the predominantly horizontal camera motion obtains more information and fewer mismatches from vertical contours.

The front building in the bottom frames shows interlace combing because it moves much faster through the field of view than the rear building. The 3D tracker anticipates this because it knows the camera motion and the scene's 3D geometry, but a 2D correlation-based tracker would interpret this as scene drift and try to compensate for it. Furthermore, because the 3D scene tracker is designed for static targets, it was found to be less distracted by moving objects than the 2D correlation-based tracker.

In some aspects, the 3D tracker may be performed by a specific-purpose computer operating with instructions stored in a memory of the computer. The stored instructions may cause one or more processors or controllers within the computer to perform a series of operations to render the 3D images, as described above. The computer may be arranged to transmit information across a network, such as a wireless network, to another computer or a receiver.

Figure 5:
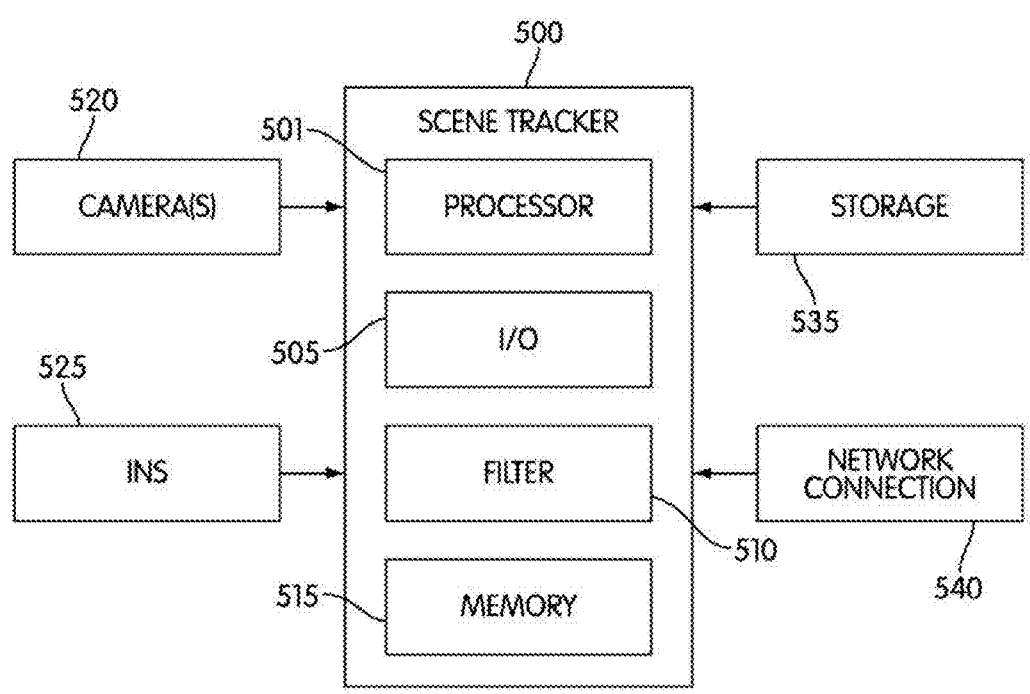
FIG. 5 shows a functional block diagram of the scene tracker in accordance with various aspects of the present invention.

FIG. 5 shows a functional block diagram of the scene tracker 500 in accordance with various aspects of the present invention. Scene tracker 500 includes any number of processors 501 (also referred to as central processing units, or CPUs) that are coupled to storage devices including memory 515 (such as random access memory, or RAM and/or read only memory, or ROM). Storage 535 is also coupled to CPU 501 and provides additional data storage capacity and may also include any of the computer-readable media described below. Storage 535 may be used to store programs, data and the like.

CPU 501 is also coupled to an interface 505 that includes one or more input/output devices such as such as video monitors, track balls, mice, keyboards, microphones, touch-sensitive displays, transducer card readers, magnetic or paper tape readers, tablets, styluses, voice or handwriting recognizers, biometrics readers, or other computers. CPU 501 optionally may be coupled to another computer or telecommunications network using a network connection as shown generally at 540. With such a network connection, it is contemplated that the CPU might receive information from the network, or might output information to the network in the course of performing the above-described method steps.

Camera(s) 520 and INS 525 are also coupled to CPU 501 and filter 510. Image frames from camera(s) 520 and data from INS 525 are supplied to the CPU 501 and filter 510 to reconstruct scene features of an object in 3D space using structure-from-motion feature-tracking using the method discussed above.

In addition, embodiments of the present invention further relate to computer storage products with a computer readable medium that have program code thereon for performing various computer-implemented operations. The media and program code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROM disks; magneto-optical media such as floptical disks; and hardware devices that are specially configured to store and execute program code, such as ROM and RAM devices. Examples of program code include both machine code, such as produced by a compiler, and files containing higher level code that may be executed by the computer using an interpreter.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is being claimed:

1. A method for reconstructing scene features of an object in three-dimensional (3D) space, the method comprising:
    acquiring, using a camera, a first camera frame at a first camera position;
    extracting image features from the first camera frame;
    initializing a first set of 3D points from the extracted image features;
    calculating a position and variance for each 3D point in the first set of 3D points;
    acquiring, using the camera, a second camera frame at a second camera position;
    predicting a second set of 3D points having corresponding 3D positions and variances by converting the corresponding 3D positions and variances of the 3D points to the second camera position;
    projecting the predicted 3D positions and variances to an image plane of the second camera position to obtain two-dimensional (2D) predictions of the image features;
    measuring an innovation of the 2D predictions; and
    updating estimates of 3D points based on the measured innovation to reconstruct the scene features of the object in the 3D space.

2. The method according to claim 1, wherein the image features from the first camera frame and the second camera frame include contours.

3. The method according to claim 1, wherein initializing the first set of 3D points include back-projecting respective positions and variances in range from the camera's image plane to a random altitude above ground level, to surfaces near an expected location of the objects in the scene, or to positions near estimated 3D positions of neighboring points.

4. The method according to claim 1, further comprising:
    obtaining a camera pose for the second camera frame from an inertial navigation system.

5. The method according to claim 1, further comprising:
    predicting new 3D points by converting respective positions and variances to a camera coordinate system.

6. The method according to claim 5, further comprising:
    projecting the predicted 3D points to a new camera image plane to obtain new 2D predictions based on the projected 3D points to the new image plane.

7. The method according to claim 1, wherein the extracted image features include contours from the second camera frame.

8. The method according to claim 7, wherein the measured innovations include measuring a displacement between the second camera frame contours and corresponding 2D predictions.

9. The method according to claim 8, further comprising:
    determining outliers by validating the measured innovations; and
    determining whether the measured innovations exceed a measurement variance by an established factor.

10. The method according to claim 9, wherein the updated estimates of 3D points and camera drift are determined using a filter.

11. The method according claim 10, wherein the filter includes a Kalman filter, an unscented Kalman filter, or an extended Kalman filter.

12. The method according to claim 1, further comprising:
    estimating a camera drift using the updated estimates of the 3D points.

13. The method according to claim 12, further comprising:
    tracking each 3D point in the updated estimates of 3D points independently, wherein each 3D point is associated with a corresponding unique variance ellipsoid.

14. The method according to claim 13, further comprising:
    merging the tracked 3D points into a single state vector to estimate collective behavior of the 3D points.

15. The method according to claim 14, further comprising:
    tracking the camera drift by appending a drift vector and a variance ellipse of the drift vector to the state vector and a variance of the state vector.

16. The method according to claim 2, further comprising:
    extracting the contours using an edge detector.

17. The method according to claim 16, wherein the extracted contours include a collection of independent edge pixels and associated tangent vectors.

18. The method according to claim 17, further comprising:
    interpolating the contours to assign a subpixel location to each of the independent edge pixels and the associated tangent vectors.

19. The method according to claim 1, wherein the first and the second camera frames are acquired from a single camera.

20. The method according to claim 1, wherein the first and the second camera frames are acquired from different cameras.

21. An article of manufacture comprising:
    a non-transitory computer readable storage medium having a computer readable program code embedded therein for reconstructing scene features of an object in three-dimensional (3D) space, said computer readable program code adapted to be executed by a processor to implement functions comprising:
    acquiring, using a camera, a first camera frame at a first camera position;

extracting image features from the first camera frame;
initializing a first set of 3D points from the extracted image features;
calculating a position and variance for each 3D point in the first set of 3D points;
acquiring, using the camera, a second camera frame at a second camera position;
predicting a second set of 3D points having corresponding 3D positions and variances by converting the corresponding 3D positions and variances of the 3D points to the second camera position;
projecting the predicted 3D positions and variances to an image plane of the second camera position to obtain two-dimensional (2D) predictions of the image features;
measuring an innovation of the 2D predictions; and
updating estimates of 3D points based on the measured innovation to reconstruct scene feature in the 3D space.

22. The article of manufacture according to claim 21, wherein the image features from the first camera frame and the second camera frame include contours.

23. The article of manufacture according to claim 21, wherein initializing the first set of 3D points include back-projecting respective positions and variances in range from the camera's image plane to a random altitude above ground level, to surfaces near expected location of the objects in the scene, or to positions near estimated 3D positions of neighboring points.

24. The article of manufacture according to claim 21, further comprising:
obtaining the second camera frame from an inertial navigation system.

25. The article of manufacture according to claim 21, further comprising:
predicting new 3D points by converting respective positions and variances to a camera coordinate system.

26. The article of manufacture according to claim 25, further comprising:
projecting the predicted 3D points to a new camera's image plane to obtain new 2D predictions based on the projected 3D points to the new image plane.

27. The article of manufacture according to claim 21, wherein the measured innovations include a displacement measured between the second camera frame contours and corresponding 2D predictions.

28. The article of manufacture according to claim 21, wherein the updated estimates of 3D points and camera drift are determined using a filter, wherein the filter includes a Kalman filter, an unscented Kalman filter, or an extended Kalman filter.

29. The article of manufacture according to claim 22, further comprising:
estimating a camera drift using the updated estimates of the 3D points.

30. The article of manufacture according to claim 29, further comprising:
tracking each 3D point in the updated estimates of 3D points independently, wherein each 3D point is associated with a corresponding unique variance ellipsoid.

31. The article of manufacture according to claim 30, further comprising:
merging the tracked 3D points into a single state vector to estimate collective behavior of the 3D points.

32. The article of manufacture according to claim 31, further comprising:
tracking the camera drift by appending a drift vector and a variance ellipse of the drift vector to the state vector and a variance of the state vector.

33. The article of manufacture according to claim 22, wherein the contours include a collection of independent edge pixels and associated tangent vectors.

34. The article of manufacture according to claim 33, further comprising:
interpolating the contours to assign a subpixel to each of the independent edge pixels and the associated tangent vectors.

35. The article of manufacture according to claim 21, wherein the first and the second camera frames are acquired from a single camera.

36. The article of manufacture according to claim 21, wherein the first and the second camera frames are acquired from different cameras.

37. A system for reconstructing scene features of an object image in three-dimensional (3D) space, the system comprising:
a camera configured to acquire a first camera frame of the object image at a first camera position and a second camera frame of the object at a second camera position;
a controller configured to:
extract image features from the first camera frame,
initialize a first set of 3D points from the extracted image features,
calculate a position and variance for each 3D point in the first set of 3D points;
predict a second set of 3D points having corresponding 3D positions and variances by converting the corresponding 3D positions and variances of the first set of 3D points to the second camera position,
project the predicted 3D positions and variances to an image plane of the second camera positions to obtain two-dimensional (2D) predictions of the image features, and
measure an innovation of the 2D predictions and update estimates of the second set of 3D points based on the measured innovation; and
an output unit configured to output the reconstructed scene features of the object image in the 3D space.

* * * * *

UNITED STATES PATENT AND TRADEMARK OFFICE
CERTIFICATE OF CORRECTION

PATENT NO. : 8,532,367 B2
APPLICATION NO. : 12/858218
DATED : September 10, 2013
INVENTOR(S) : Vitaliy M. Kaganovich It is certified that error appears in the above-identified patent and that said Letters Patent is hereby corrected as shown below:

On the title page, in column 1, Item (56) under "Other Publications", line 1, delete "al:" and insert --al.,--, therefor On the title page, in column 2, Item (56) under "Other Publications", line 1, delete "al:" and insert --al.,--, therefor On the title page, in column 2, Item (56) under "Other Publications", line 3, delete "al:" and insert --al.,--, therefor On the title page, in column 2, Item (56) under "Other Publications", line 5, delete "al:" and insert --al.,--, therefor On the title page, in column 2, Item (56) under "Other Publications", line 15, delete "E," and insert --E.,--, therefor On the title page, in column 2, Item (56) under "Other Publications", line 17, delete "M," and insert --M.,--, therefor On the title page, in column 2, Item (56) under "Other Publications", line 18, delete "Mailed" and insert --mailed--, therefor On title page 2, in column 2, Item (56) under "Other Publications", line 9, after "Fusion", delete "and,", therefor In the Specification In column 7, line 34, delete "$(z-(x))^T R^{-1}(z-h(x)).$" and insert --$(z-h(x))^T R^{-1}(z-h(x)).$--, therefor In column 8, line 42, delete " $\vec{X}$ " and insert -- $\overline{x}$ --, therefor Signed and Sealed this
Fourth Day of February, 2014

Michelle K. Lee
*Deputy Director of the United States Patent and Trademark Office*